US008300963B2

United States Patent
Ohk et al.

(10) Patent No.: US 8,300,963 B2
(45) Date of Patent: Oct. 30, 2012

(54) APPARATUS AND METHOD OF MATCHING SYMBOLS IN A TEXT IMAGE CODING AND DECODING SYSTEM

(75) Inventors: Hyung-Soo Ohk, Seoul (KR); Jonghyon Yi, Yongin-si (KR); Charles A. Bouman, West Lafayette, IN (US); Maribel Figuera, Tora (ES)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/019,400

(22) Filed: Feb. 2, 2011

(65) Prior Publication Data

US 2011/0158545 A1 Jun. 30, 2011

Related U.S. Application Data

(62) Division of application No. 11/626,543, filed on Jan. 24, 2007, now Pat. No. 7,907,783.

(51) Int. Cl.
*G06K 9/36* (2006.01)
*G06K 9/68* (2006.01)
*G06K 9/46* (2006.01)

(52) U.S. Cl. .................... 382/232; 382/218

(58) Field of Classification Search ............. 382/170, 382/176, 186, 187, 204, 218–220, 222, 224, 382/232, 233, 243, 257, 276; 341/50, 51, 341/63, 67, 87, 106, 107; 345/173; 707/101; 715/855

See application file for complete search history.

(56) References Cited

U.S. PATENT DOCUMENTS

| 4,288,782 | A | | 9/1981 | Bader et al. |
| 5,148,522 | A | | 9/1992 | Okazaki |
| 5,572,604 | A | | 11/1996 | Simard |
| 5,835,638 | A | | 11/1998 | Rucklidge et al. |
| 5,867,114 | A | * | 2/1999 | Barbir ................ 341/107 |
| 6,272,242 | B1 | | 8/2001 | Saitoh et al. |
| 6,522,268 | B2 | * | 2/2003 | Belu ................ 341/51 |
| 6,987,882 | B2 | | 1/2006 | Curry et al. |
| 7,365,658 | B2 | * | 4/2008 | Todorov et al. ........ 341/63 |
| 7,403,136 | B2 | * | 7/2008 | De La Cruz et al. ..... 341/51 |
| 7,596,272 | B2 | | 9/2009 | Sternby |

(Continued)

FOREIGN PATENT DOCUMENTS

| GB | 2181875 | 4/1987 |
| JP | 2003-348360 | 12/2003 |
| KR | 2003-84590 | 11/2003 |
| KR | 10-599141 | 7/2006 |

OTHER PUBLICATIONS

Office Action issued in Chinese Patent Application No. 200810008762.0 on Aug. 25, 2011.

(Continued)

*Primary Examiner* — Amir Alavi
(74) *Attorney, Agent, or Firm* — Stanzione & Kim, LLP

(57) ABSTRACT

An apparatus of a text image coding and decoding system includes a matching unit to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference.

9 Claims, 8 Drawing Sheets

U.S. PATENT DOCUMENTS

| | | |
|---|---|---|
| 7,689,588 B2 | 3/2010 | Badr et al. |
| 7,907,783 B2 * | 3/2011 | Ohk et al. ............... 382/218 |
| 2002/0033762 A1 | 3/2002 | Belu |
| 2003/0202709 A1 | 10/2003 | Simard et al. |
| 2006/0109148 A1 | 5/2006 | Yi |
| 2006/0239560 A1 | 10/2006 | Sternby |
| 2007/0150497 A1 | 6/2007 | De La Cruz et al. |
| 2008/0175487 A1 | 7/2008 | Ohk et al. |
| 2011/0158545 A1 * | 6/2011 | Ohk et al. ............... 382/218 |

OTHER PUBLICATIONS

Office Action issued in European Patent Application No. 08 150 512.5 on Feb. 11, 2010.

Office Action issued in Korean Patent Application No. 10-2007-0025728 on Oct. 18, 2011.

Office Action issued in U.S. Appl. No. 11/626,543, filed Jun. 16, 2010.

European Search Report dated May 15, 2008 issued in EP Application No. 08150512.5.

Chinese Office Action issued Mar. 23, 2011 in CN Application No. 200810008762.0.

Chinese Rejection Decision issued on Jan. 6, 2012 in CN Patent Application No. 200810008762.0.

Decision of Rejection Issued on May 29, 2012 in KR Patent Application N. 10-2007-0025728.

* cited by examiner

APPARATUS AND METHOD OF MATCHING SYMBOLS IN A TEXT IMAGE CODING AND DECODING SYSTEM

CROSS-REFERENCE TO RELATED APPLICATIONS

This application is a divisional of application Ser. No. 11/626,543, filed on Jan. 24, 2007 now U.S. Pat. No. 7,907,783 in the U.S. Patent and Trademark Office.

BACKGROUND OF THE INVENTION

1. Field of the Invention

The present invention relates to an apparatus and method of matching symbols in a text image coding and decoding system, and more particularly, to an apparatus and method of reducing the number of matching operations and improving a quality/bit rate and a speed of a matching operation in a pattern matching based coding and decoding system.

2. Description of the Related Art

Generally, the JBIG2 standard, described in ITU-T T.88, defines a compression method for bi-level images, that is, images consisting of a single rectangular bit plane, with each pixel taking on one of just two possible colors. The JBIG2 standard only defines requirements for decoding a compliant bit stream corresponding to the images, and does not define a specific feature of an encoder design, but is flexible to many optimizations that can improve quality, compression, or speed of the encoder design.

In addition, the JBIG2 standard is the first international standard that provides for lossy, lossless, and lossy-to-lossless compression of the bi-level images, and supports multi-page images and model-based coding for text and halftones. The JBIG2 standard also permits compression ratios that are three to eight times better than previous standards, such as G3, G4, and JBIG1.

A bi-level document may contain one or more pages, and each page may contain text data, halftone data, and other data, such as line art or noise, as an input bi-level image. The JBIG2 encoder is expected to segment the input bi-level image into different regions, usually three regions, and to code each region separately using a different coding method.

FIG. 1 is a view illustrating a composite image as an input image to be decomposed into three regions in the JBIG2 standard, such as a text region, a halftone region, and a generic region.

The JBIG2 standard includes encoding the text region of the input image using a symbol dictionary. The input image is split into horizontal stripes. Each stripe is scanned in raster order to extract connected components (symbols). Each symbol extracted is compared with reference symbols in the symbol dictionary. If a match is found between the symbol of the input page and the reference symbols of the symbol dictionary, the symbol of the input image is encoded using the following information: its location offset relative to its preceding symbols, a dictionary index pointing to its best match with the reference symbol in the symbol dictionary, and a refinement of an encoded bitmap of the symbol of the input image. If the match is not found, a new symbol corresponding to the unmatched symbol of the input image is added to the symbol dictionary. This pattern matching based coding system is known as Pattern Matching and Substitution (PM&S).

The matching procedure generally operates by examining an error map, which is the bitwise exclusive-OR between the new symbol and a reference symbol of the dictionary. Before calculating the error map, the new symbol and the reference symbol are aligned appropriately with respect to each other, so that each pixel in one of the new symbol and the reference symbol can be mapped to the other one of the new symbol and the reference symbol. The error map is then evaluated using a distance metric. The distance metric is determined as follows.

Exclusive-OR (XOR) is used to computes the Hamming distance of the error map, that is, measure from the difference between the two symbols by the total number of pixels that are set in the error map.

Weighted Exclusive-OR (WXOR) is used to weigh the error pixels differently depending on the context in which the error occurs. Each error pixel contributes an amount that equals the number of error pixels in its 3*3 neighborhood. As a result, error pixels that occur in a cluster are more significant. FIG. 2 illustrates the WXOR operation where each white circle is an error pixel and the number inside the circle is the associated weight.

Weighted AND NOT (WAN) is used to weigh the error pixels in the same way as WXOR, but weights black-to-white errors differently from white-to-black ones.

Improved Weighted Exclusive-OR is used to let A and B be the symbols or bitmaps to be compared to generate metric differentiates between two error maps, $E_1$ and $E_2$. $E_1$ contains pixels set in bitmap A but not in B, and $E_2$ contains pixels set in B but not in A. The final error map is the sum of both.

Hausdoff distance is used to give a small effective weight to boundary pixels and to give a large effective weight to pixels that are not very near the boundary.

In order to cluster symbols into self-similar categories, a threshold is used to decide whether a match should be accepted or rejected. The result in each case is a binary decision, "match" or "no match". A match is rejected if the error or distance exceeds the predefined threshold.

FIG. 2 is a diagram illustrating a weight exclusive or distance metric, for example, Weighted Exclusive-OR distance metric. Here, with the XOR distance metric, letters "c" and "o" are more similar than two versions of the letter "e." However, with WXOR, a distance between the letters "e" is less than a distance between "c" and "o." The XOR distance metric may lead to substitution errors unless a very tight threshold is defined. On the other hand, the very tight threshold may result in a big symbol dictionary, thereby reducing the bit rate. The WXOR distance metric can reduce the number of substitution errors in the encoding of a document without reducing the bit rate when using PM&S, however it has some computational overhead compared to the XOR metric.

Referring to FIG. 2, a view (a) illustrates A, B, and A+B to generate an error map produced by the comparison of two versions of the letter "e," which results in an XOR distance of 29 and a WXOR distance of 75. A view (b) illustrates C, D, and C+D to generate an error map produced by the comparison of the letters "c" and "o" which results in an XOR distance of 23 and a WXOR distance of 131. Notice that WXOR distance assigns a greater error distance than XOR between the mismatched "c" and "o" symbols.

However, the above conventional matching process has disadvantages in that a processing time is increased, and that a bit rate is decreased.

SUMMARY OF THE INVENTION

The present general inventive concept provides an apparatus and method of matching symbols in a text image coding and decoding system.

The present general inventive concept provides an apparatus and method of reducing the number of matching operations and improving a quality/bit rate and a speed of a matching operation in a pattern matching based coding and decoding system a dynamic symbol caching apparatus and method of managing a dictionary composed of different symbols in a text image coding and decoding system.

The present general inventive concept provides a pattern matching based coding and decoding system to perform a matching process using a plurality of distances and a plurality of reference distances.

The present general inventive concept provides a pattern matching based coding and decoding system having an improved error map to reduce a matching processing time.

Additional aspects and/or advantages of the present invention will be set forth in part in the description which follows and, in part, will be obvious from the description, or may be learned by practice of the present invention.

The foregoing and/or other aspects of the present invention may be achieved by providing an apparatus usable in a text image coding and decoding system, the apparatus including a matching unit to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference.

The matching unit may include a first comparator to compare the first distance and the first reference to determine whether the symbol matches with the reference symbol, and a second comparator to compare the second distance and the second reference to determine whether the symbol matches with the reference symbol.

A new reference symbol may be created to correspond to the symbol and stored in the symbol dictionary when the symbol does not match with the reference symbol according to the comparison of the first controller The matching unit may determine that the symbol matches with the reference symbol according to the comparison of the second controller.

A new reference symbol may be created to correspond to the symbol and stored in the symbol dictionary when the symbol does not match with the reference symbol according to the comparison of the second comparator.

The first reference may include a first sub-reference and a second sub-reference, the first comparator may include a first sub-comparator to compare the first distance with the first sub-reference and a second sub-comparator to compare the first distance with the second sub-reference, and the matching may determine that the symbol matches with the reference symbol according to the comparisons of the first and second sub-comparators.

The second reference may be different from the first and second sub-reference.

A new reference symbol may be created to correspond to the symbol and stored in the symbol dictionary when the symbol does not match with the reference symbol according to the comparisons of the first and second sub-comparators.

The matching unit may determine that the symbol matches with the reference symbol according to the comparison of the second controller.

The apparatus may include a coding unit to code the symbol according to information on the reference symbol and a location of the symbol of the text image when the symbol matches with the reference symbol according to the comparisons of the first and second sub-comparators and the second comparator.

The apparatus may further include a decomposer to decompose image data to extract the text image having one or more symbols including the symbol, and a coder to code the symbol with information on the reference symbol and a location of the symbol in the text image.

The apparatus may further include a scanner to scan an object to generate a scanned image as the image data.

The apparatus may further include a controller to control the symbol dictionary to create a new reference symbol when the symbol does not match with the reference symbol according to the first and second distances and the first and second references.

The first distance may be an XOR distance.

The second distance may be a WXOR distance.

The second reference may have a value greater that that of the first reference.

The matching unit may compare the XOR distance with the first reference to determine whether to use the reference symbol to represent the symbol or to create the symbol as a new reference symbol.

The foregoing and/or other aspects of the present invention may be achieved by providing a method of a text image coding and decoding system, the method including computing a first distance between a symbol of a text image with a reference symbol of a symbol dictionary, determining whether the symbol matches with the reference symbol according to the first distance and a first reference, computing a second distance between the one of the symbols with the reference symbol if the symbol does not match with the reference symbol according to the first distance and the first reference, and determining whether the symbol matches with the reference symbol according to the second distance and a second reference.

The determining of whether the symbol matches with the symbol may include comparing the first distance and the first reference in a first comparator to determine whether the symbol matches with the reference symbol, and comparing the second distance and the second reference in a second comparator to determine whether the symbol matches with the reference symbol.

The method may further include creating a new reference symbol to correspond to the symbol, and storing the created reference symbol in the symbol dictionary when the symbol does not match with the reference symbol according to the comparison of the first controller.

The comparing of the first distance and the first reference may include determining that the symbol matches with the reference symbol according to the comparison of the second controller.

The method may further include creating a new reference symbol to correspond to the symbol, and storing the created reference symbol in the symbol dictionary when the symbol does not match with the reference symbol according to the comparison of the second controller.

The first reference may include a first sub-reference and a second sub-reference, the first comparator may include a first sub-comparator to compare the first distance with the first sub-reference and a second sub-comparator to compare the first distance with the second sub-reference, and the determining of whether the symbol matches with the reference symbol may include determining that the symbol matches with the reference symbol according to the comparisons of the first and second sub-comparators.

The second reference may be different from the first and second sub-reference.

The method may further include creating a new reference symbol to correspond to the symbol, and storing the created new reference symbol in the symbol dictionary when the symbol does not match with the reference symbol according to the comparisons of the first and second sub-comparators.

The method may further include determining that the symbol matches with the reference symbol according to the comparison of the second controller.

The method may further include coding the symbol according to information on the reference symbol and a location of the symbol of the text image when the symbol matches with the reference symbol according to the comparisons of the first and second sub-comparators and the second comparator.

The method may further include decomposing image data to extract the text image having one or more symbols including the symbol, and coding the symbol with information on the reference symbol and a location of the symbol in the text image.

The method may further include scanning an object to generate a scanned image as the image data.

The method may further include controlling the symbol dictionary to create a new reference symbol when the symbol does not match with the reference symbol according to the first and second distances and the first and second references.

The foregoing and/or other aspects of the present invention may also be achieved by providing a computer readable recording medium containing computer readable codes as a program to execute a method in a text image coding and decoding system, the method including computing a first distance between a symbol of a text image with a reference symbol of a symbol dictionary, determining whether the symbol matches with the reference symbol according to the first distance and a first reference, computing a second distance between the one of the symbols with the reference symbol if the symbol does not match with the reference symbol according to the first distance and the first reference, and determining whether the symbol matches with the reference symbol according to the second distance and a second reference.

The foregoing and/or other aspects of the present invention may also be achieved by providing an apparatus usable in a text image coding and decoding system, the apparatus including a matching unit to determine whether a symbol of input image data and a reference symbol of a dictionary match according to at least two different distances between the symbol and the reference symbol and at least two different reference values.

The foregoing and/or other aspects of the present invention may also be achieved by providing an apparatus usable in a text image coding and decoding system, the apparatus including a matching unit to determine whether a symbol of input image data and a reference symbol of a dictionary match according to a coarse operation using a first distance and a first reference, and to determine whether the symbol of the input image data and the reference symbol of the dictionary match according to a fine operation using a second distance and a second reference when the symbol of the input image data and the reference symbol of the dictionary do not match in the coarse operation.

The foregoing and/or other aspects of the present invention may also be achieved by providing a text image coding and decoding system, including an encoding apparatus to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference, so that an encoded signal is generated according to the determination using the first and second distances and the first and second references, and a decoding apparatus to receive the encoded signal encoded according to the determination using the first and second distances and the first and second references, and to decode the received signal to reproduce the text image.

The foregoing and/or other aspects of the present invention may also be achieved by providing a method of a text image coding and decoding system, the method including computing a first distance between a symbol of a text image with a reference symbol of a symbol dictionary, to determine whether the symbol matches with the reference symbol according to the first distance and a first reference, computing a second distance between the one of the symbols with the reference symbol if the symbol does not match with the reference symbol according to the first distance and the first reference, determining whether the symbol matches with the reference symbol according to the second distance and a second reference, so that an encoded signal is generated according to the determination using the first and second distances and the first and second references, and decoding the encoded signal encoded according to the determination using the first and second distances and the first and second references to reproduce the text image.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which:

FIG. 5 is a view illustrating a test image used in the text image coding and decoding system of FIG. 3;

DETAILED DESCRIPTION OF THE PREFERRED EMBODIMENTS

Figure 1:
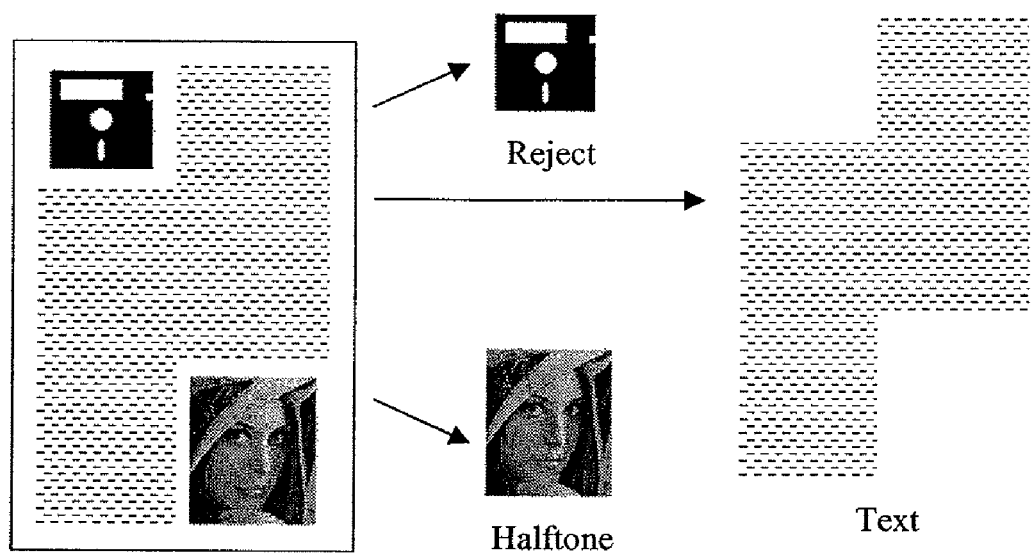
FIG. 1 is a schematic view an input image divided into three regions in a conventional image encoding and decoding system.
Figure 2:
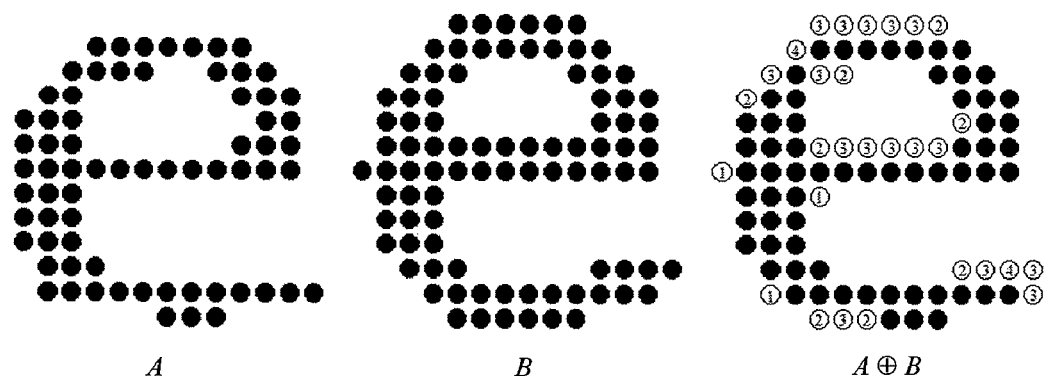
FIG. 2 is a diagram illustrating a weight exclusive or distance metric.
Figure 2:
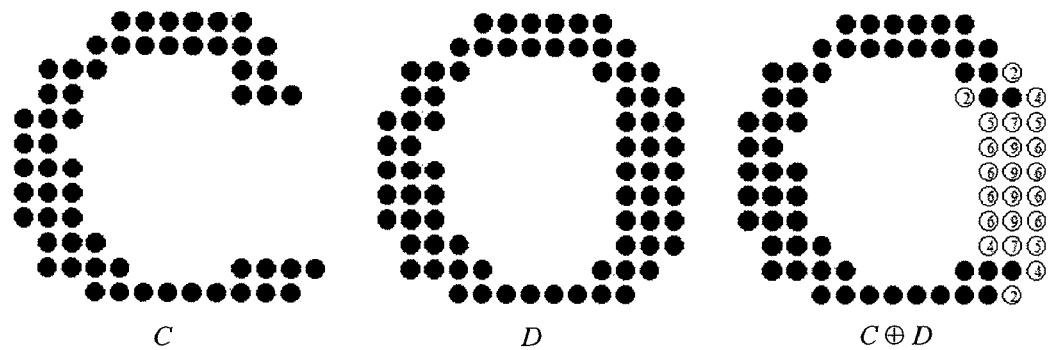

Reference will now be made in detail to the embodiments of the present invention, examples of which are illustrated in the accompanying drawings, wherein like reference numerals refer to like elements throughout.

The present general inventive concept provides a method of obtaining a computational speed of an XOR metric while retaining a compression ratio comparable to a WXOR metric. Using the XOR metric, the method can quickly identify matches between a symbol and a reference symbol in a coarse operation, and then when the matches are uncertain, the WXOR metric can be used as a more accurate operation. The present embodiment can be applied to the JBIG 2 encoding of a bi-level document. In this case, the matching method is used to compare symbols and form a dictionary in coarse and fine operations. The present embodiment of the matching method may be called prescreened weighted exclusive OR (PWXOR).

Figure 3:
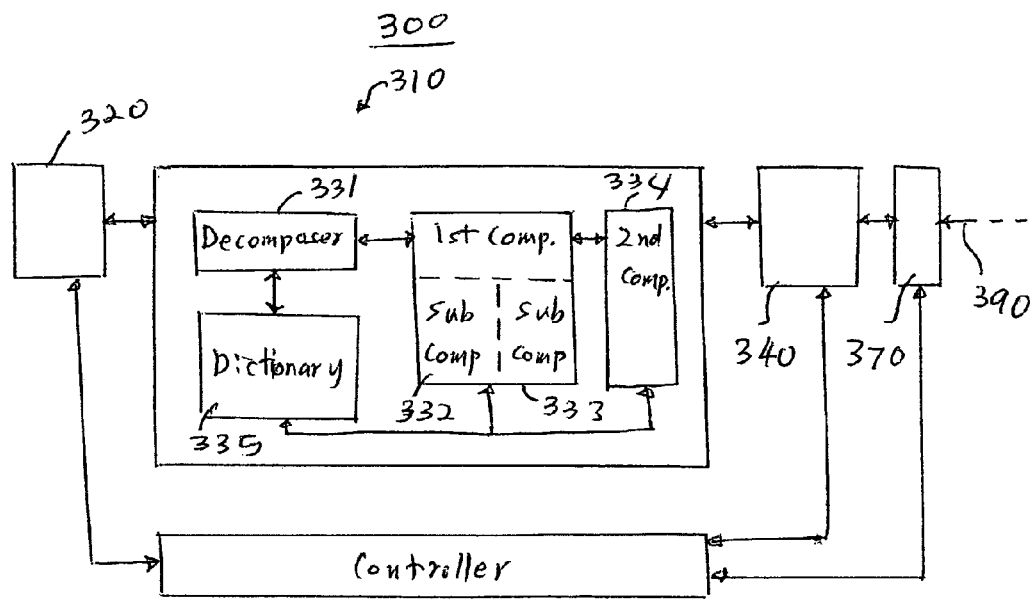
FIG. 3 is a diagram illustrating an apparatus usable with a text image coding and decoding system according to an embodiment of the present general inventive concept.
Figure 3:
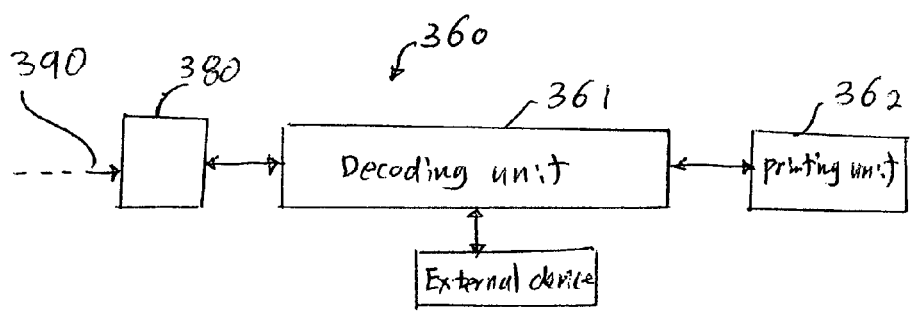

FIG. 3 is a diagram illustrating an apparatus usable with a text image coding and decoding system 300 according to an embodiment of the present general inventive concept.

Referring to FIG. 3, the text image coding (encoding) and decoding system 300 may include an encoding apparatus 310 and a decoding apparatus 360. The encoding apparatus may include a scanner 320, a matching unit 330, a coder 340, and a controller 350. The decoding apparatus 360 may include a decoding unit 361 and a printing unit 362. The text image coding (encoding) and decoding system 300 may include transmitting units 370 and 380 to transmit and receive encoded data between the encoding apparatus 310 and the decoding apparatus 360 through a line 390, such as a circuit, a wire network, or a wireless network.

The scanner 320 may include a scanning unit to emit light toward a document, to receive the light reflected from the document, and to generate an input signal corresponding to a scanned image from the received light as an input image (or image data). A conventional scanner may be used as the scanner 320.

The matching unit 330 may include a decomposer 331, a first comparator having a sub comparator 332 and another sub comparator 333, a second comparator 334, and a dictionary 335 such as a memory to store reference symbols as a dictionary.

The composer 331 decomposes the input signal (or scanned image) into binary image signals (bi-level image signals) representing three different regions, such as a text region, a halftone region, and a generic region. Here, the composer 331 may include a divider to divide or split the text region into one or more stripes and also may include an extractor to extract one or more symbols from each of the stripes (or stripe images). Each stripe may be a portion of the test region scanned in raster order to extract connected components as the symbols.

The controller 350 controls the matching unit 330 to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference. The controller 350 may compute the first distance and the second distance. The first reference and the second reference may be stored in the controller 350 or the matching unit 330.

The sub comparator 332 compares the first distance with a sub-reference, and the another sub comparator compares the first distance with another sub-reference.

The second comparator 334 compares the second distance and the second reference to determine whether the symbol matches with the reference symbol.

The controller 350 controls to the scanner 320, the matching unit 330 to determine when the symbol matches with the reference symbol, and to reject or accept the match between the symbol and the reference symbol, the coder 340 to encode an output signal of the matching unit 330, and the transmitting unit 370 to transmit the encoded signal to an external device or the decoding apparatus 360 through the line 390.

The decoding unit 361 receives the encoded signal including coded symbols to form the stripe images according to information on the respective symbols and the dictionary.

The decoding unit 361 may receive coded symbols corresponding to respective stripe images together with information on the symbols and the dictionary.

The decoding unit 361 may receive index information on the reference symbol and location information on the symbol in the respective stripes to reproduce an image with the stripes according to the received information.

The decoding unit 361 may output data decoded therefrom, and the printing unit 362 may print the output data including the formed strips including the symbols on a printing medium. The decoding unit 361 may output the decoded data or text image data to an external device through a circuit, a wire network, or a wireless network. The printing unit 362 may be an inkjet print unit to eject ink droplets on the printing medium using one or more inkjet heads having one or more ink nozzles, a laser beam printing unit to form a latent image using a laser beam and to develop the latent image with a developer, such as toner, etc.

According to the present embodiment, an apparatus usable in the text image coding and decoding system 300 may include the matching unit 330 to determine whether a symbol of input image data and a reference symbol of a dictionary match according to at least two different distances between the symbol and the reference symbol and at least two different reference values.

According to the present embodiment, an apparatus usable in the text image coding and decoding system 300 may include the matching unit 330 to determine whether a symbol of input image data and a reference symbol of a dictionary match according to a coarse operation using a first distance and a first reference, and to determine whether the symbol of the input image data and the reference symbol of the dictionary match according to a fine operation using a second distance and a second reference when the symbol of the input image data and the reference symbol of the dictionary do not match in the coarse operation.

According to the present embodiment, the text image coding and decoding system 300 may include the encoding apparatus 310 to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference, so that an encoded signal is generated according to the determination using the first and second distances and the first and second reference.

The text image coding and decoding system 300 may also include the decoding apparatus 360 to receive the encoded signal encoded according to the determination using the first and second distances and the first and second references, and to decode the received signal to reproduce the text image.

The text image coding and decoding system 300 may also include the printing unit 362 to print an image on a printing medium as the text image according to the decoded signal.

Figure 4:
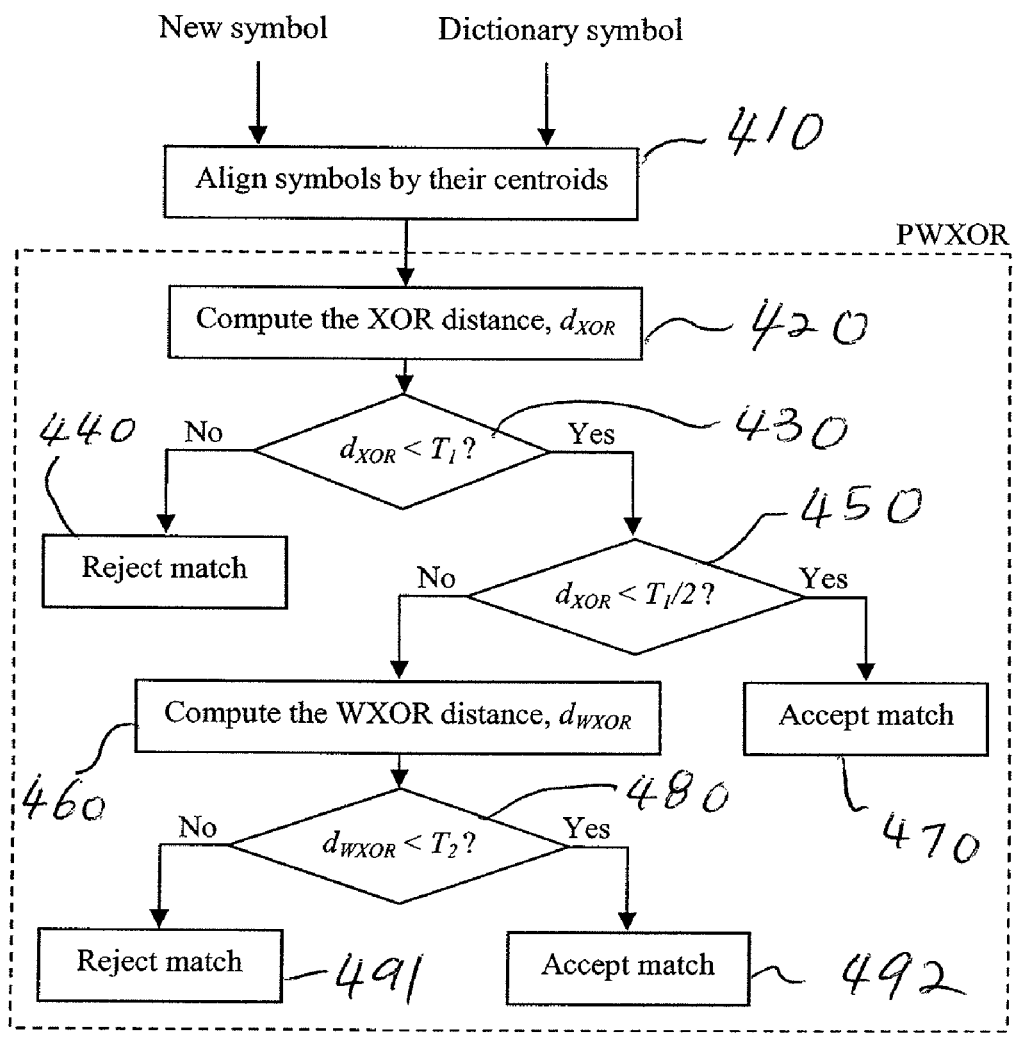
FIG. 4 is a flowchart illustrating a matching method of a text image coding and decoding system according to an embodiment of the present general inventive concept.

FIG. 4 is a flowchart illustrating a matching method of a text image coding and decoding system according to an embodiment of the present general inventive concept.

Referring to FIGS. 3 and 4, at operation 410 the symbol extracted from the page and a reference symbol in the dictionary are aligned by, for example, a reference line or centroids, so that an error map is generated from the aligned symbol and the reference symbol. At operation 420 An XOR distance, $d_{XOR}$, is computed by counting the total number of pixels that are set in the error map. A screening method then determines if the WXOR metric between the two symbols needs to be computed according to an output of the operation 420.

If the XOR distance between the two symbols is greater than a predetermined threshold $T_1$, the match is rejected without further consideration at operation 440. If the distance is less than half of the threshold, that is $T_1/2$, the match is accepted and the symbols are said to be similar and the algorithm ends. However, when the distance is less than $T_1$ but greater than $T_1/2$ at operation 450, a WXOR operation between the two symbols is computed to obtain a new distance $d_{WXOR}$ at operation 460, and evaluated at operation 480. when the WXOR distance is less than a predetermined threshold $T_2$, the match is accepted at operation 492, otherwise the match is rejected at operation 491. For each distance metric, an appropriate threshold is determined and chosen to be as selective as possible without affecting the outcome of the classification process of the above method.

Figure 5:
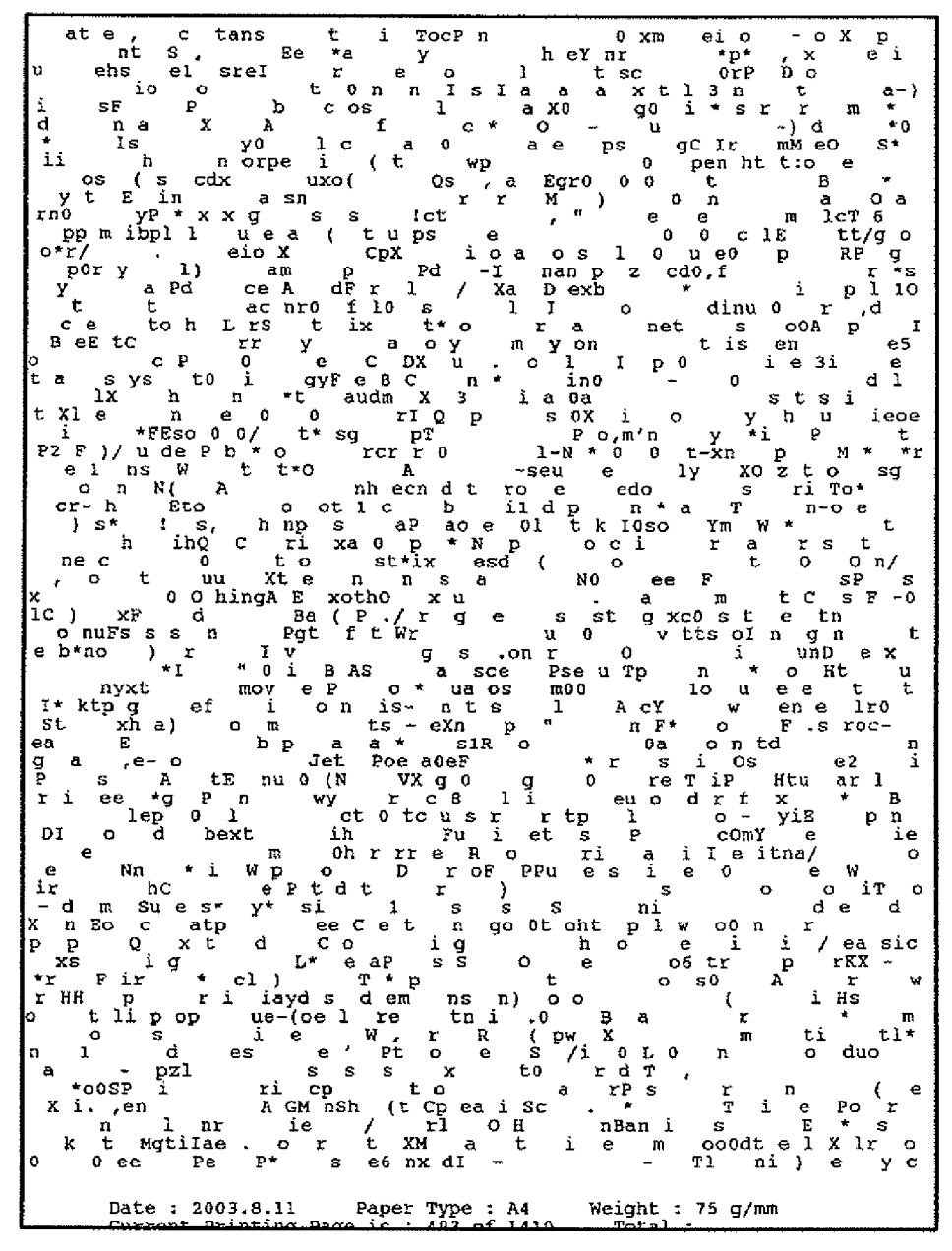

FIG. 5 is a view illustrating a test image used in the text image coding and decoding system of FIG. 3. A bi-level image was used the test image as illustrated in FIG. 5. The bi-level image was encoded using three different types of metrics, for example, XOR, WXOR, and PWXOR.

The image has the following features.
Dimension: 1566×2122
Resolution: 192 dpi
Size: 407 KByte
Full clean characters
No skew
Contains 1639 symbols FIG. 6 is a view illustrating compression ratios of a conventional image encoding and decoding system and the text image coding and decoding system of FIG. 3, and FIG. 7 is a view illustrating graphs of average numbers of symbol matches required in a conventional image encoding and decoding system and the text image coding and decoding system of FIG. 3

Figure 6:
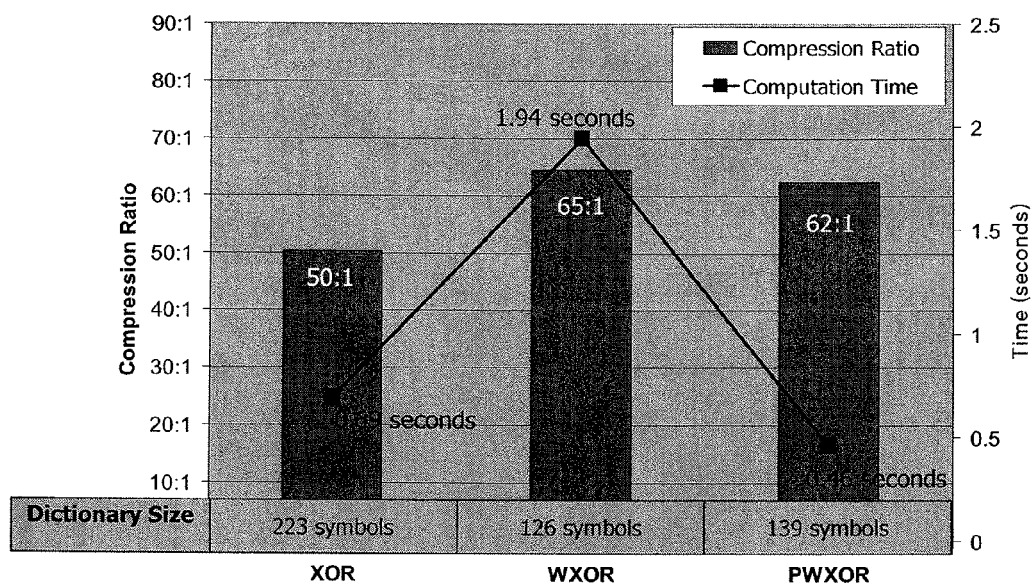
FIG. 6 is a view illustrating compression ratios of a conventional image encoding and decoding system and a text image coding and decoding system according to an embodiment of the present general inventive concept.

Referring to FIG. 6, the present embodiment of the PWXOR provides a much faster algorithm than the WXOR and XOR with a compression ratio which is similar to that obtained from the WXOR, which is much higher than the one obtained from the XOR.

Figure 7:
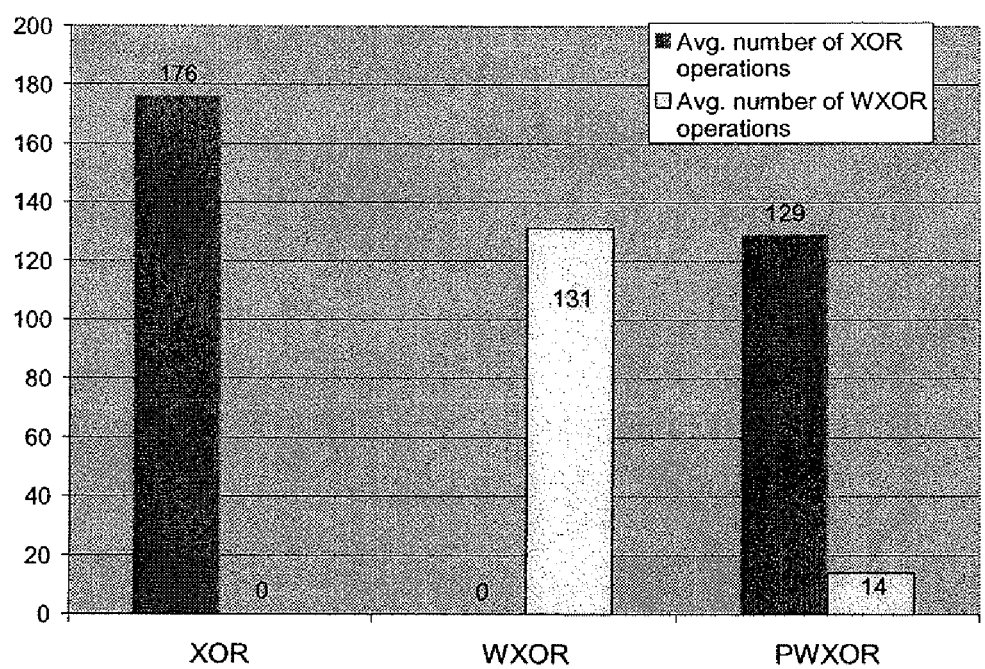
FIG. 7 is a view illustrating graphs of average numbers of symbol matches required in a conventional image encoding and decoding system and a text image coding and decoding system according to an embodiment of the present general inventive concept.

Referring to FIG. 7, comparison of the three matching metrics (XOR, WXOR, and PWXOR) in terms of speed and compression ratio at the same quality level.

FIG. 7 compares the average number of symbol matches that are required per each symbol that is extracted from a page (text image). A larger dictionary is required to compare each new symbol with a greater number of symbols. Therefore, a computation time for JBIG2 encoding will be directly related to a size of the symbol dictionary. As illustrated in FIG. 7, while the XOR and WXOR metrics require an average of 176 and 131 matching operations per symbol respectively, the PWXOR only requires 129 XOR operations and 14 WXOR operations per symbol.

According to the present embodiment, the apparatus can be extended to use a sequence of matching metrics, $d_1, d_2, \ldots, d_n$, where the computation required to compute $d_i$ is much less than the computation required to compute $d_{i+1}$.

Figure 8:
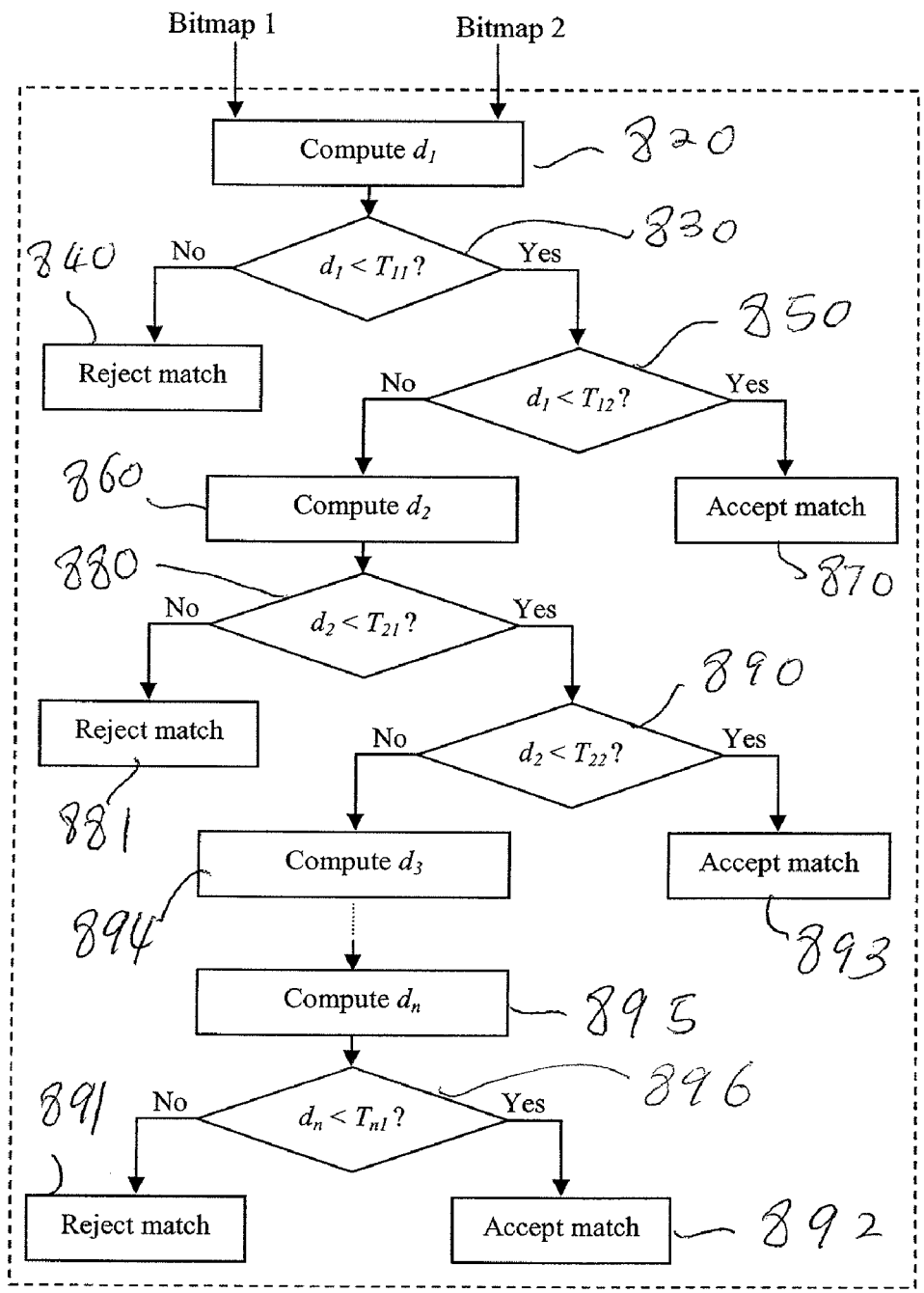
FIG. 8 is a flowchart illustrating matching method of a text image coding and decoding system according to an embodiment of the present general inventive concept.

FIG. 8 is a flowchart illustrating a matching method of a text image coding and decoding system according to an embodiment of the present general inventive concept. Referring to FIGS. 3, 4, and 8, operations of FIG. 8 are similar to operations of FIG. 4. Thus, detail descriptions of the similar operation will be omitted.

At operation 820 a distance $d_i$ is computed, and the distance $d_i$ is compared with a threshold $T_{11}$ at operation 830. $T_{i2} < T_{i1}$ are thresholds that the distance $d_i$ will be compared to. When the threshold $T_{11}$ is not met at operation 830, a match is rejected with no further computation required at operation 840. When the threshold $T_{11}$ is met at operation 830, the distance $d_i$ is further compared with the threshold $T_{12}$ at operation 850. When the threshold $T_{12}$ is met, a match is accepted with no further computation required, at operation 870.

When the threshold $T_{12}$ is not met, a second distance $d_2$ is computed at operation 880. the second distance $d_2$ is compared with a threshold $T_{21}$ at operation 890. When the threshold $T_{21}$ is met, a match is accepted at operation 893. When the threshold $T_{21}$ is not met, a third distance $d_3$ and an $n^{th}$ distance $d_n$ are computed at operation 894 and operation 895, respectively. The third distance $d_3$ or the $n^{th}$ distance $d_n$ is compared with an $n^{th}$ threshold $T_{n1}$ at operation 896. When the $n^{th}$ distance $d_n$ is smaller than the $n^{th}$ threshold $T_{n1}$, a match is accepted at operation 892.

when the $n^{th}$ distance $d_n$ is not smaller than the $n^{th}$ threshold $T_{n1}$, a match is rejected at operation 891. That is, the first condition is met, and the second is not met, then the next more complex metric $d_{i+1}$ is applied. This recursive prescreening process reduces total computation, while achieving nearly the accuracy of the most computationally expensive metric $d_n$.

As described above, according to the present embodiment, a method of a text image coding and decoding system includes computing a first distance between a symbol of a text image with a reference symbol of a symbol dictionary, determining whether the symbol matches with the reference symbol according to the first distance and a first reference, computing a second distance between the one of the symbols with the reference symbol if the symbol does not match with the reference symbol according to the first distance and the first reference, and determining whether the symbol matches with the reference symbol according to the second distance and a second reference.

As described above, according to the present embodiment, a method of a text image coding and decoding system includes determining whether a symbol of input image data and a reference symbol of a dictionary match according to at least two different distances between the symbol and the reference symbol and at least two different reference values.

As described above, according to the present embodiment, an apparatus usable in a text image coding and decoding system includes determining whether a symbol of input image data and a reference symbol of a dictionary match according to a coarse operation using a first distance and a first reference, and determining whether the symbol of the input image data and the reference symbol of the dictionary match according to a fine operation using a second distance and a second reference when the symbol of the input image data and the reference symbol of the dictionary do not match in the coarse operation.

According to the present embodiment, two metrics are combined, that is, the fastest one of the metrics is used as a screening method to compute a more complex metric. Therefore, the present embodiment reduces the number of template matching operations that are undertaken, while simultaneously improving the quality/bit rate.

The present general inventive concept can also be embodied as computer-readable codes as programs on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the present general inventive concept provides a new method of matching two binary images. Text images are a special type of the binary image because they contain many repeated text characters, hence being highly redundant at the character level. Text image compression methods, such as JBIG2, take advantage of this redundancy by coding the text based on pattern matching techniques. In a pattern matching based coding system, rather than coding all the character bitmaps (called symbols) in the input image pixel by pixel, the encoder first selects a representative subset of symbols from all symbols and transmits them as the dictionary.

The distance metric used to compare two symbols is a key to obtaining a fast and accurate compression algorithm, resulting in a high compression ratio. Our invention consists of combining two existing distance metrics, the exclusive-OR (XOR) and the weighted exclusive-OR (WXOR) to form a new method of measuring distance that reduces computation time while preserving the same quality and compression ratio. Specifically, our algorithm uses the XOR metric to prescreen the WXOR metric thereby retaining the speed of the XOR metric and the quality/compression ratio of the WXOR metric. This invention, named PWXOR, is useful for any coding method that uses Pattern Matching and Substitution (PM&S) because it reduces the high cost of the matching process while simultaneously improving the quality/bit rate; here we use JBIG2 as an example application where the PWXOR method is beneficial.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A text image coding and decoding system, comprising:
an encoding apparatus to compute a first distance between a symbol of a text image with a reference symbol of a symbol dictionary, to determine whether the symbol matches with the reference symbol according to the first distance and a first reference, and to compute a second distance between the one of the symbols with the reference symbol if the symbol does not match with the reference symbol according to the first distance and the first reference, and to determine whether the symbol matches with the reference symbol according to the second distance and a second reference, so that an encoded signal is generated according to the determination using the first and second distances and the first and second references; and
a decoding apparatus to receive the encoded signal encoded according to the determination using the first and second distances and the first and second references, and to decode the received signal to reproduce the text image.

2. A method of a text image coding and decoding system, the method comprising:
using a computer to perform operations of:
computing a first distance between a symbol of a text image with a reference symbol of a symbol dictionary, to determine whether the symbol matches with the reference symbol according to the first distance and a first reference;
computing a second distance between the one of the symbols with the reference symbol if the symbol does not match with the reference symbol according to the first distance and the first reference;
determining whether the symbol matches with the reference symbol according to the second distance and a second reference, so that an encoded signal is generated according to the determination using the first and second distances and the first and second references; and
decoding the encoded signal encoded according to the determination using the first and second distances and the first and second references to reproduce the text image.

3. An apparatus in a text image coding and decoding system, comprising:
a matching unit to compute a first distance between a symbol of a text image with a reference symbol of a symbol dictionary, to determine whether the symbol matches with the reference symbol according to the first distance and a first reference, and to compute a second distance between the symbol with the reference symbol if the symbol does not match with the reference symbol according to the first distance and the first reference, and to determine whether the symbol matches with the reference symbol according to the second distance and a second reference; and
a coder to generate an encoded signal according to the determination according to the first distance and the first reference and the determination according to the second distance and the second reference.

4. The apparatus of claim 3, wherein the matching unit comprises:
a first comparator to compare the first distance and the first reference to determine whether the symbol matches with the reference symbol; and
a second comparator to compare the second distance and the second reference to determine whether the symbol matches with the reference symbol.

5. The apparatus of claim 4, wherein:
the first reference comprises a first sub-reference and a second sub-reference;
the first comparator comprises a first sub-comparator to compare the first distance with the first sub-reference and a second sub-comparator to compare the first distance with the second sub-reference; and the matching unit determines that the symbol matches with the reference symbol according to the comparisons of the first and second sub-comparators.

6. The apparatus of claim 3, further comprising:

a decomposer to decompose image data to extract the text image having one or more symbols including the symbol.

7. The apparatus of claim 3, further comprising:

a scanner to scan an object to generate a scanned image as the image data.

8. The apparatus of claim 3, further comprising:

a controller to control the symbol dictionary to create a new reference symbol when the symbol does not match with the reference symbol according to the first and second distances and the first and second references.

9. The apparatus of claim 3, wherein:

the first distance comprises an exclusive-OR (XOR) distance computed by counting a total number of pixels in a first error map that is generated via an XOR operation between the symbol and the reference symbol;

the second distance comprises a weighted exclusive-OR (WXOR) distance computed by counting a total number of weights of pixels in a second error map that is generated via an XOR operation between the symbol and the reference symbol with the weights assigned to the pixels in the second error map based on surrounding pixels; and the matching unit compares the XOR distance with the first reference to determine whether to use the reference symbol to represent the symbol or to create the symbol as a new reference symbol.

\* \* \* \* \*

UNITED STATES PATENT AND TRADEMARK OFFICE
CERTIFICATE OF CORRECTION

Page 1 of 1

PATENT NO. : 8,300,963 B2
APPLICATION NO. : 13/019400
DATED : October 30, 2012
INVENTOR(S) : Hyung-Soo Ohk et al.

It is certified that error appears in the above-identified patent and that said Letters Patent is hereby corrected as shown below:

On the Title Page

Item (73) Assignee:
Change "Samsung Electronics Co., Ltd. Suwon-si (KR)" to

-- Samsung Electronics Co., Ltd., Suwon-si (KR);
Purdue Research Foundation, West Lafayette, IN (US) --

Signed and Sealed this
Twenty-eighth Day of January, 2014

Michelle K. Lee
*Deputy Director of the United States Patent and Trademark Office*